April 14, 1953  A. C. BODY ET AL  2,635,177
HIGH-FREQUENCY INDUCTOR ARRANGEMENT
Filed April 26, 1951  2 SHEETS—SHEET 1
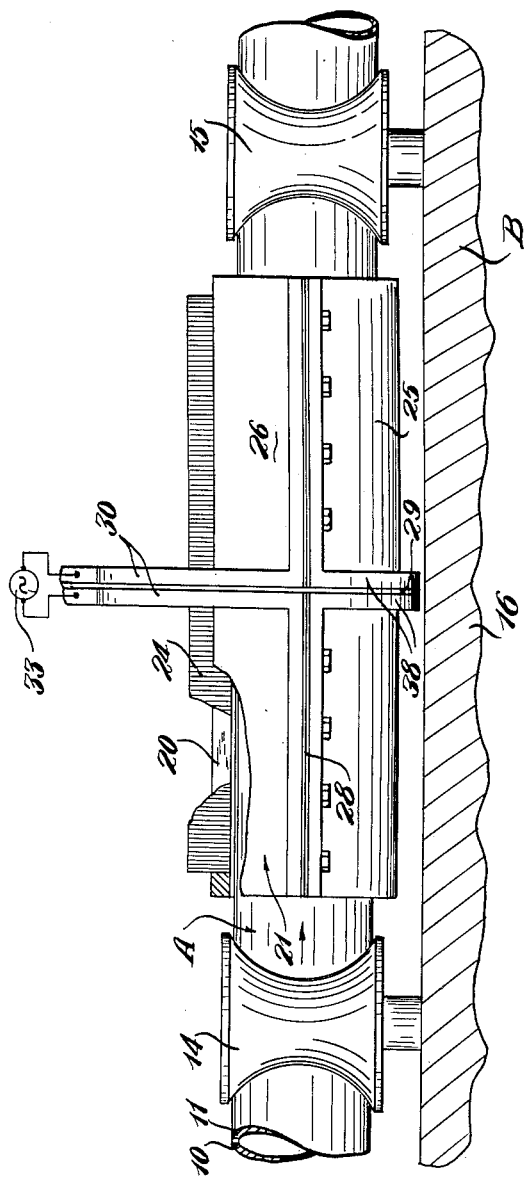
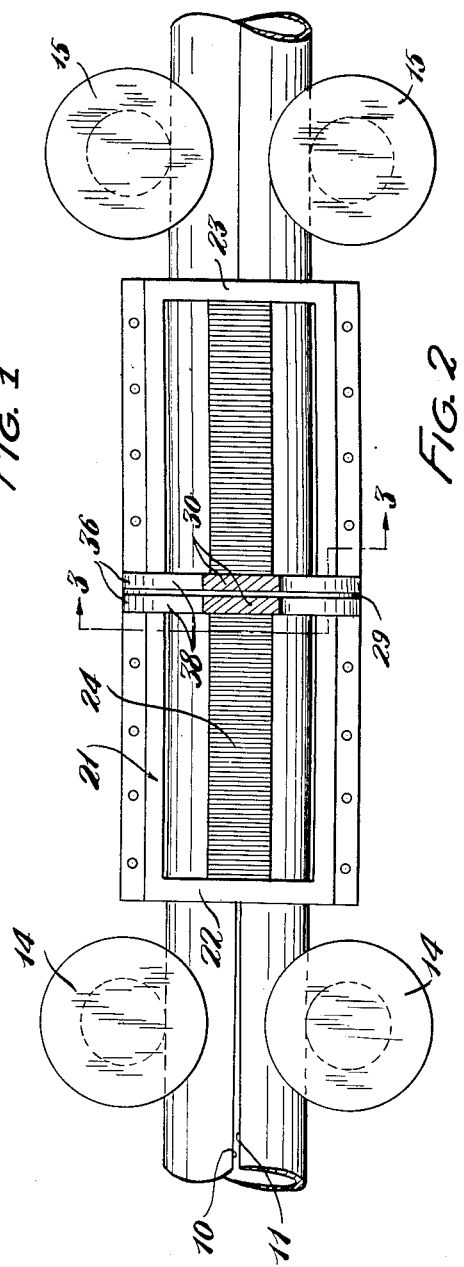
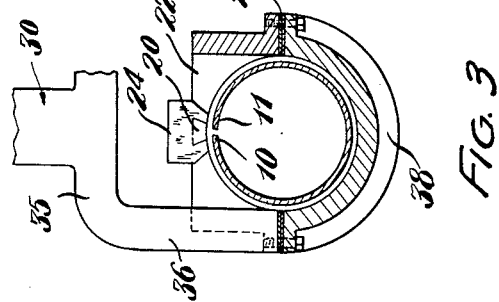
INVENTOR.
ALFRED C. BODY
BY JOHN F. CACHAT
ATTORNEY

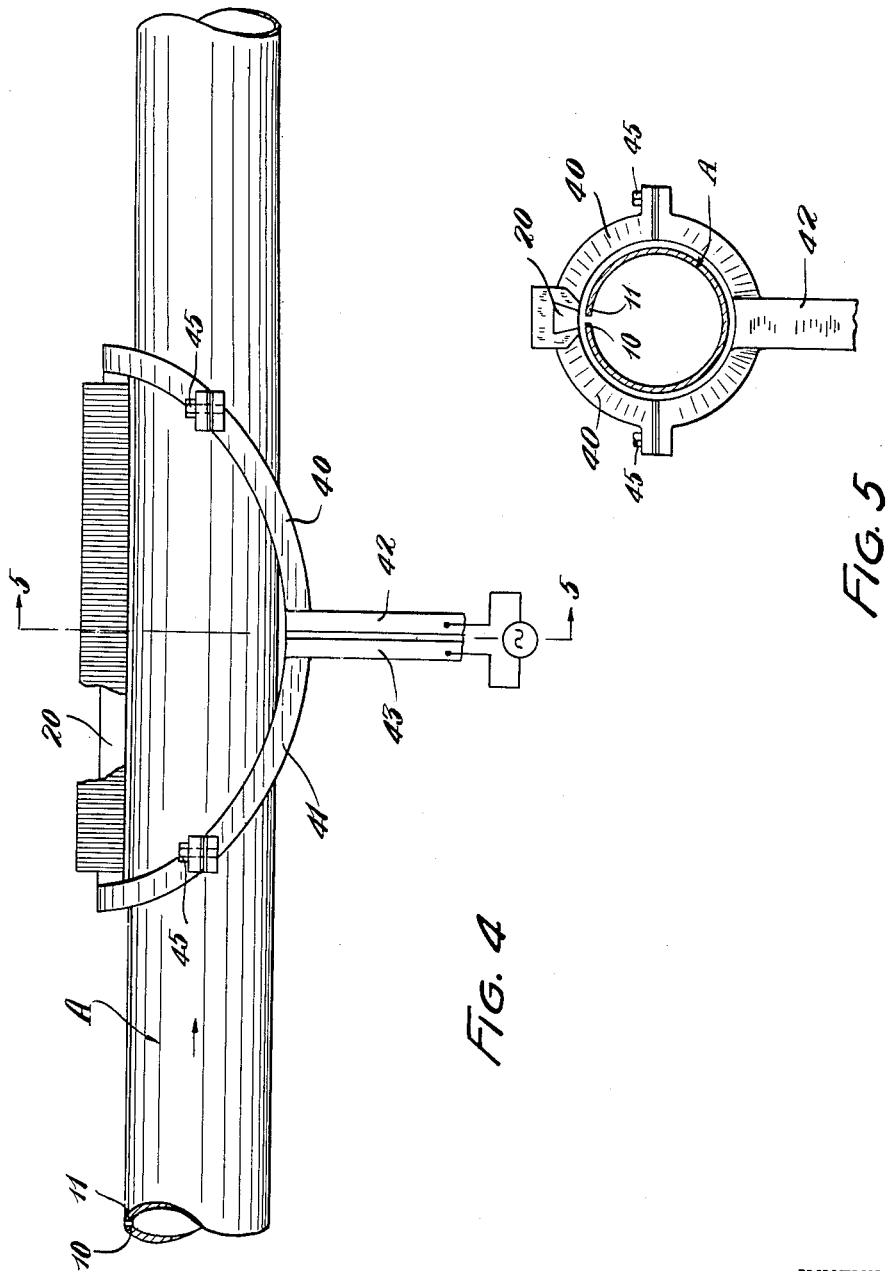

Patented Apr. 14, 1953

2,635,177

UNITED STATES PATENT OFFICE 2,635,177

HIGH-FREQUENCY INDUCTOR ARRANGEMENT

Alfred C. Body and John F. Cachat, Cleveland, Ohio, assignors to The Ohio Crankshaft Company, Cleveland, Ohio, a corporation of Ohio Application April 26, 1951, Serial No. 223,112

5 Claims. (Cl. 219—47)

The present application is a continuation in part of our copending United States patent application Serial No. 98,104 filed June 9, 1949, and, as in that application, the present invention pertains to the art of high-frequency induction heating and, more particularly, to a high-frequency inductor construction for heating narrow elongated lengths on an elongated metallic workpiece.

The invention is particularly adapted to equipment for continuous seam welding of the edges of metallic strip into pipe or tube using high-frequency induction heating to heat the edges to the welding temperature and, for the purpose of clarity, will be described with particular reference to such equipment, although the invention is useful elsewhere. The use of high-frequency induction heating and suitable inductors for heating the edges have been clearly set forth and described in the copending applications of Phillips N. Sorensen, Serial No. 58,228 filed November 4, 1948, and Serial No. 86,066 filed April 7, 1949, now abandoned. The present invention provides means in combination with inductors of this type for accomplishing the objects of the invention.

In the art of continuous seam welding, flat strip is formed by suitable rolls into a generally closed tube with the edges in close spaced opposed relationship. The edges are then heated to a welding temperature by high-frequency induction heating. The heated edges are then brought into pressure engagement by welding rolls to complete the weld, the entire operation being done continuously and at rather high rates of speed. A typical installation now in use continuously welds at tube speeds of around 200 feet per minute using approximately 300 kws. of 10,000 cycle per second electrical energy.

As described in the above referred to applications, the high-frequency inductors include an elongated main conductor which is disposed parallel to and immediately over the edges of the tube to be heated and one or more side or return conductors which are disposed remotely from the edges and generally adjacent the sides of the tube. High-frequency currents flowing in the main conductor induce highly concentrated, high-frequency currents to flow longitudinally in each edge immediately underneath the conductor. It has been estimated that these currents, for the conditions above referred to, are in the neighborhood of 8,400 amperes and flow in a very narrow width adjacent the edges to produce a very rapid and concentrated heating effect. The return-current path is, according to the above referred to applications, in the portions of the tube remote from the edges. These currents, while generally of the same magnitude as the current in the edges themselves, are spread out over a large part of the circumferential width of the tube and do not produce any appreciable heating.

Excellent welds have been produced at high speeds of movement of the tube using inductors of this type. However, difficulty has been experienced with unduly short life of the bearings which support the forming and welding rolls on the base of the machine.

It now appears that the ideal current flow described above which it was thought resulted with the inductors as above described does not actually result and that some of the concentrated main heating currents in the edges, instead of returning in the portions of the tube remote from the edges, actually flow longitudinally of the tube beyond the ends of the inductor, the return path being formed through the forming and welding rolls and the metallic base of the seam-welding machine. These currents flow through the bearings supporting the rolls and, either by electrolysis or arcing or otherwise, deteriorated the surfaces of the bearing and radically shortened their life.

This current flow may be due to a number of reasons which now seem quite apparent but required much thought and experimental work before becoming so. For example, the electrical resistance of the side walls of the tube under the inductor is extremely low and it was thought that all of the return currents would, obviously, follow this path as a return path. However, upon further analysis, it appears that the welding machine itself; that is, the welding rolls, the forming rolls and the base of the machine, form a parallel electrical circuit with the side walls of the tube. The electrical resistance of this circuit may be relatively high compared to that of the side walls of the tube; but, even with a difference of twenty times, with a total return-current flow in excess of 8,000 amperes, the electrical circuit through the machine would carry currents in excess of 400 amperes. Another reason to which the return-current flow through the welding machine itself may be attributed is the fact that the main heating conductor normally has a much higher degree of electrical coupling with the tube than do the side conductors; i. e., the side conductors have a higher leakage reactance than the main conductor which shows up as currents flowing through the electrical circuit formed by the base of the machine itself and the rolls.

It has been proposed to use rolls which are electrically insulated from the base or to divide the base under the inductor and electrically insulate the two sections or to provide other forms of electrical insulation on the seam-welding equipment, but any one of these solutions would involve major redesigning and reconstruction of the seam-welding equipment and would, in any event, be quite expensive.

It is believed that an inductor having a return leg identical to the main heating leg would obviate the above referred to difficulties of stray currents. However, a return leg constructed similarly to the heating leg would also produce heating in the walls of the tube remote from the edges, which heating would be an undesirable waste of electrical energy. For maximum efficiency, the return currents should be spread out in the portions of the tube laterally spaced from the heated portion to a maximum degree.

The present invention contemplates an inductor construction for overcoming all of the above difficulties and eliminating or lessening the flow of current through the work-piece supporting forming and welding rolls and providing a maximum distribution of the return currents throughout the portions of the tube spaced from the edges which is simple in construction, inexpensive to manufacture and dependable in operation.

In accordance with the present invention, a high-frequency inductor is provided for heating narrow elongated portions on an elongated workpiece which comprises a narrow elongated main conductor adapted to be in close spaced parallel relationship with the portion on the workpiece to be heated, and an adjacent return conductor or leg which completely envelops or encloses portions along the length of the workpiece laterally spaced from the portion being heated, the leg being adapted to be in close spaced relationship with these portions.

The return leg or portions thereof is made separable from the remainder of the inductor so that it may be readily disassembled when it is desired to remove the inductor from operative relationship with a workpiece, the parts having electrically interengaging surfaces so that, when assembled, the leg is, to all intents and purposes from an electrical standpoint, a single unitary conductor.

The return leg may be generally a C- or U-shaped sleeve having rather widely spaced edges with the ends of the sleeve electrically connected to the corresponding adjacent edges of the main conductor or leg; or, alternatively, the return leg may be an elongated narrower ocnductor or conductors extending spirally about the workpiece from one end of the main leg or conductor to the other end. The inductor may be energized by splitting either the main leg or the side legs or the point of connection between the side legs and the main leg and applying high-frequency electrical energy on both sides of the split.

An object of the invention is the provision of a new and improved high-frequency inductor which includes an elongated main heating leg or conductor which is adapted to be in close spaced relationship with an elongated portion of a workpiece to be heated and a return conductor which completely envelops portions along the workpiece laterally spaced from the portion being heated and connected at the ends to the ends of the main conductor.

Another object of the invention is the provision of a new and improved high-frequency inductor of the type described including an elongated narrow main heating conductor and a return conductor in the shape of a U- or C-shaped sleeve with spaced edges, the ends of the sleeve being electrically connected to the corresponding adjacent ends of the main conductor, the C-shaped sleeve surrounding portions along the workpiece laterally spaced from the narrow portion being heated.

Another object of the invention is the provision of a new and improved high-frequency inductor for heating narrow elongated lengths on an elongated workpiece which includes a narrow elongated main heating conductor and a side or return leg which completely envelops portions along the length of the workpiece laterally spaced from the narrow portions to be heated and connected at the ends to the corresponding adjacent ends of the main heating conductor, the return or side legs being made in a plurality of separable parts so that the inductor may be disassembled when it must be removed from operative relationship with a workpiece.

Another object of the invention is the provision of a new and improved high-frequency inductor for heating narorw elongated lengths on an elongated workpiece wherein the return leg may have a degree of coupling with the workpiece equal to the degree of coupling of the main heating conductor and yet produce a current concentration on the sides of the workpiece laterally spaced from the heated portion which will not appreciably produce any heating effect therein.

The invention will be specifically set forth and defined in the claims appended to the end hereof. The invention may take physical form in a number of different-appearing parts and arrangement of parts, a preferred embodiment of which will be described in detail in this specification and illustrated in the attached drawing which is a part hereof, and wherein:

Figure 1 is a side elevational view with portions broken away of a high-frequency inductor embodying the present invention;

Figure 2 is a top elevational view;

Figure 3 is a cross-sectional view of Figure 1 taken approximately on the line 3—3 thereof;

Figure 4 is a side elevational view of an alternative embodiment of the invention; and Figure 5 is a cross-sectional view of Figure 4 taken approximately on the line 5—5 thereof.

Referring now to the drawings wherein the showings are for the purposes of illustrating preferred embodiments of the invention only and not for the purposes of limiting the invention, Figure 1 shows a workpiece in the form of a length of C-shaped tube A having edges 10, 11 to be heated and welded, which tube is moving from left to right through workpiece supports in the form of a continuous seam-welding machine comprised of opposed pairs of forming and welding rolls 14, 15 respectively rotatably supported on a base 16 shown as continuous between the rolls 14, 15, although, of course, it may be formed in a plurality of pieces joined together by one means or another. The forming and welding rolls 14, 15 are longitudinally spaced and a high-frequency inductor arrangement C constructed in accordance with the present invention is positioned between these rolls in inductive relationship with the tube A.

The tube A may be of any known or desired shape and is shown, for the purposes of convenience, as being round. The tube may be formed of any known metallic material but, for the purposes of this invention, will be described as being of low-carbon steel which, as is well known, is magnetic at temperatures below about 1,300° F. and nonmagnetic above this temperature, the temperature being known as the "Curie" point or temperature.

The details of the machine B form no part of the present invention and, for the purposes of simplicity, only a single pair of forming rolls 14 and a single pair of welding rolls 15 are shown. There will necessarily be more forming rolls and there may be more sets of welding rolls. The forming and welding rolls are normally supported relative to the base 16 by means of roller bearings not shown and either or both sets of rolls may be power driven by power means also not shown.

The tube A generally leaves the forming rolls 14 with the edges 10, 11 in slightly spaced relationship, passes under the inductor C where the edges are heated rapidly to a forge-welding temperature and then the tube passes through the welding rolls 15 where the edges are pressed into a forge-welding relationship, the entire process being continuous and done at high speeds of movement in excess of 100 feet per minute.

The inductor C comprises generally an elongated, straight, main heating conductor 20 which extends longitudinally of the tube A in close spaced, parallel and symmetrical relationship to the edges 10, 11 and a side or return conductor shown generally at 21 connected at its ends to the ends of the main heating conductor 20 by short, laterally-extending legs 22, 23. The main conductor 20 is formed of copper or other high-conductivity material and is generally trapezoidally shaped with the shorter of the parallel surfaces facing the edges 10, 11. Laminations 24 of magnetically-permeable material in the shape of an inverted U surround the three surfaces of the main conductor other than the workpiece-facing surface. The close spacing of the main conductor 20 and the laminations 24 provides a high degree of coupling between the conductor 20 and the edges 10, 11, notwithstanding the relatively limited workpiece-facing area of the conductor 20.

The main conductor 20 at each end abuts and is electrically connected to the mid point of the end conductors 23, 24 which extend transversely over the top of the tube A beyond the sides thereof. These end conductors then connect at their ends to the ends of the side conductor 21. The side conductor 21 is formed in a plurality of parts which, in assembled relationship, are generally U-shaped in cross section having an arcuate base 25 and spaced parallel legs 26. As shown, this side conductor 21 generally envelops the portions along the tube A laterally spaced from the edges 10, 11 under the main conductor 20. The legs 26 are generally comprised of flat elongated conductor members which extend in parallel relationship along the length of the tube A so spaced relative to each other as to allow clearance for the tube A.

In the embodiment shown, the upper edges of the legs 26 are generally level with the upper surface of the main conductor 20 but may be other than that shown. The lower edges of the legs 26 abut against the upper edges of the base 25 and are in electrical contact therewith, silver pads 28 being brazed to each of the abutting edges to provide an improved electrical contact. The lower edge of the legs 26 and the upper edges of the base 25 each have outwardly-extending flanges which increase the abutting area and the current-carrying capacity thereof. Bolts are threaded through the flanges to hold the base and legs in rigid assembled relationship. Obviously, clamps or other attaching means could be provided or a hinged construction could be employed.

The outer ends of the legs 26 are brazed to the ends or sides of the side conductor 22 so that currents may flow from the main conductor 20 to the side conductor 21.

If desired, the side conductor 21 could be made in one U-shaped piece and bolted to the end conductors 23, 24.

The side conductor 21 is transversely split as at 29 midway between its ends and a pair of fishtail leads 30 connect at one end to opposite sides of the slit and at the other end to a high-frequency power source 33. The fish-tail leads in the embodiment shown are generally in the shape of an inverted U having a base 35 and a pair of spaced, parallel, downwardly-extending legs 36, the lower end of which legs 36 are brazed to the upper edge of the legs 26 adjacent the split 29. As shown, the width of the legs 36 is somewhat wider than the thickness of the legs 26 to provide an improved current distribution over the entire width of the leg 26. Likewise, the adjacent edges of the base 25 have a transverse flange 38 adjacent the split to aid in the current distribution over the entire side conductor 21.

The upper edge of the center of the base 35 of the fishtail leads has an upwardly-extending conductor which connects to the high-frequency power source 33 through a suitable impedance-matching transformer not shown.

The inductor C is shown as having solid conductor members but, in actual practice, because of the very high currents flowing in the conductors, these conductors would be of hollow construction and cooling water would be continuously flowed therethrough by means of suitable plumbing connections made to the inductor. For the purposes of simplicity, the plumbing connections have been omitted as they are relatively conventional and connections of this type have been shown in the parent application and in the above referred to applications of Sorensen.

In operation, high-frequency current flows into the inductor through one of the fish-tail leads 30, thence longitudinally of the tube A through, for example, the left-hand portion of the return conductor 21 to the end conductors 22 where it flows transversely of the tube A to the main conductor 20. These currents then flow longitudinally of the tube A and parallel to the edges 10, 11 through the main conductor 20 to the other or right-hand end of the inductor C where the currents again flow laterally through the end conductor 23 to the right-hand half of the side conductor 21 where the currents flow to the left to the other fish-tail lead and back to the high-frequency power source 33.

The currents flowing in the main conductor 20 induce high-frequency currents to flow in a very concentrated manner in the edges 10, 11, which high-frequency currents heat these edges very rapidly to the forge-welding temperature. The workpiece-facing area of the main conductor 20 is rather limited but because of the laminations thereabout, the coupling is very high. On the other hand, it is desired with the side conductor 21 to have a minimum of current concentration in the walls of the tube remote in the edges 10, 11 and, yet, in order for the flow of currents to be prevented through the welding rolls 14, 15 in the base of the welding machine 16, it is necessary that the side conductor 21 have a degree of coupling with the tube A which is equal to the coupling of the main conductor 20. This is accomplished with the present invention by providing a side conductor which substantially envelops the portions of the tube laterally adjacent to the edges 10, 11 under the main conductor 20. The construction of the side conductors shown provides a degree of coupling with the tube A which is equal to the degree of coupling of the main conductor 20 with its laminations thereabout.

Figures 4 and 5 show an alternative embodiment of the invention. In this embodiment, the main conductor 20 with its laminations is identical to that shown in the preferred embodiment. The side conductors, however, comprise a pair of conductors 40 connected at one end to an end of the main conductor 20 and which extend in an elongated spiral or helix about the walls of the tube A in a direction toward the other end of the main conductor 20. The pitch of this helix is preferably equal to the length of the main conductor 20 and the two conductors are electrically connected at a point midway of the length of the main conductor 20 and at a point 180 degrees opposite therefrom. Side conductors 41 extend from the other end of the main conductor 20 in a like manner to a point generally midway of the length of the main conductor 20 and at a point 180 degrees opposite therefrom. Fish-tail leads 42, 43 connect to the two conductors and extend to a high-frequency power source not shown. The ends of the conductors 40, 41 are in close spaced insulated relationship. The conductors 40 in a manner similar to that shown in the preferred embodiment are divided along their length into two separate pieces which are held in assembled relationship by bolts 45 threaded in laterally-extending flanges on the conductors at the points of the split.

Silver-contacting pads can be placed between the abutting surfaces. The operation of the alternative embodiment of the invention is much similar to that of the preferred embodiment and will not be further described here.

The inductors shown are all constructed of high-conductivity copper members all brazed into a rigid, substantially integral construction.

In accordance with the patent laws, preferred embodiments of the invention have been described for the purposes of explaining and illustrating the invention. Obviously, the invention is not limited to the specific forms and embodiments shown for alterations and modifications will occur to others upon a reading and understanding of this specification and it is our intention to include all such modifications and alterations insofar as they come within or are the equivalent of the appended claims.

Having thus described our invention, we claim:

1. A high-frequency inductor for heating a narrow band on continuously-moving elongated lengths of metallic material comprising an elongated magnetically-permeable member generally U-shaped in cross section including a base and a pair of generally parallel legs extending from said base, a first elongated conductor member between said legs and having a relatively narrow workpiece-facing surface on the side thereof opposite from said base and adapted to be in close-spaced parallel relationship to said material and a second conductor member substantially spaced from said magnetically-permeable material and said elongated conductor member in electrical series relationship with said first-mentioned conductor member and having a relatively wide elongated workpiece-facing surface spaced from the workpiece-facing surface of said first conductor member, said second conductor member over its entire length being curved to correspond to the shape of said workpiece and in close-spaced inductive relationship with at least 180 degrees thereof.

2. A high-frequency inductor for heating a narrow band on continuously-moving elongated lengths of metallic material comprising an elongated magnetically-permeable member generally U-shaped in cross section including a base and a pair of generally parallel legs extending from said base, a first elongated conductor member between said legs and having a relatively narrow workpiece-facing surface on the side thereof opposite from said base and adapted to be in close-spaced parallel relationship to said material and a second conductor member substantially spaced from said magnetically-permeable material and said elongated conductor member in electrical series relationship with said first-mentioned conductor member and having a relatively wide elongated workpiece-facing surface spaced from the workpiece-facing surface of said first conductor member, the improvement which comprises said second conductor member being generally U-shaped in cross section and having a base diametrically opposite from said first conductor and a pair of legs extending in spaced relationship from said base toward said first conductor on both sides of said workpiece to a point at least above the axis thereof and spaced from said magnetically-permeable member.

3. A high-frequency inductor for heating a narrow band on continuously-moving elongated lengths of metallic material comprising an elongated magnetically-permeable member generally U shaped in cross section including a base and a pair of generally parallel legs extending from said base, a first elongated conductor member between said legs and having a relatively narrow workpiece-facing surface on the side thereof opposite from said base and adapted to be in close-spaced parallel relationship to said material and a second conductor member substantially spaced from said magnetically-permeable material and said elongated conductor member in electrical series relationship with said first-mentioned conductor member and having a relatively wide elongated workpiece-facing surface spaced from the workpiece-facing surface of said first conductor member, the improvement which comprises said second conductor member including conductors extending from each of said first conductor, said conductors at each end extending in both circumferential direction in a general helical direction toward the opposite end of said conductor and around said workpiece whereby said second conductor envelops at least 180 degrees of said workpiece.

4. The combination of claim 3 wherein said conductors extending on the ends of said first conductor meet at a point generally diametrically opposite from said first conductor and midway of the length thereof and means for energizing said inductor at the point of meeting of said conductors.

5. The combination of claim 2 wherein said second conductor is divided over its entire circumferential extent midway between its ends and means for energizing said inductor on each side of the division.

ALFRED C. BODY.
JOHN F. CACHAT.

References Cited in the file of this patent

UNITED STATES PATENTS

| Number | Name | Date |
|---|---|---|
| 2,422,417 | Hutchinson | June 17, 1947 |
| 2,467,201 | Frazier | Apr. 12, 1949 |
| 2,475,348 | Black | July 5, 1949 |
| 2,483,973 | Goettings | Oct. 4, 1949 |
| 2,493,950 | Dow et al. | Jan. 10, 1950 |
| 2,582,955 | Body | Jan. 22, 1952 |
| 2,582,963 | Cachat | Jan. 22, 1952 |

FOREIGN PATENTS

| Number | Country | Date |
|---|---|---|
| 616,063 | Great Britain | Jan. 14, 1949 |
| 616,117 | Great Britain | Jan. 17, 1949 |
| 951,765 | France | Nov. 3, 1949 |